United States Patent
Maeda

(10) Patent No.: US 7,675,569 B2
(45) Date of Patent: Mar. 9, 2010

(54) IMAGE SENSING APPARATUS HAVING AN IMAGE SENSOR

(75) Inventor: Muneyoshi Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 11/782,815

(22) Filed: Jul. 25, 2007

(65) Prior Publication Data
US 2008/0024655 A1    Jan. 31, 2008

(30) Foreign Application Priority Data
Jul. 28, 2006  (JP)  ............................. 2006-206966

(51) Int. Cl.
*H04N 5/225* (2006.01)
*H04N 3/15* (2006.01)
*H04N 5/335* (2006.01)

(52) U.S. Cl. ...................... 348/371; 348/302

(58) Field of Classification Search ................. 348/370, 348/371, 302, 308
See application file for complete search history.

(56) References Cited

U.S. PATENT DOCUMENTS 7,428,378 B1 * 9/2008 Warpakowski Furlan .... 348/371
2004/0223075 A1 * 11/2004 Furlan et al. ................. 348/363
2006/0140615 A1 * 6/2006 Suzuki ........................ 396/155
2007/0263106 A1 * 11/2007 Tanaka et al. ............... 348/297
2008/0165265 A1 * 7/2008 Chiba et al. ................. 348/371

FOREIGN PATENT DOCUMENTS

JP   2002-359774 A   12/2002
JP   2006-050337 A    2/2006

* cited by examiner

*Primary Examiner*—Jason Whipkey
(74) *Attorney, Agent, or Firm*—Canon U.S.A., Inc. I.P. Division

(57) ABSTRACT

An imaging apparatus includes an image sensor configured to image an object to generate image data, a flash control unit configured to control a main flash, to be performed by a flash unit configured to emit flash to an object, according to preliminary image data generated by the image sensor in association with a pre-flash performed by the flash unit, a first drive unit configured to adjust starting timings of exposures performed at a plurality of lines of the image sensor to a same timing when the pre-flash is performed, and a second drive unit configured to shield the image sensor from light before the preliminary image data is read from the image sensor.

2 Claims, 5 Drawing Sheets

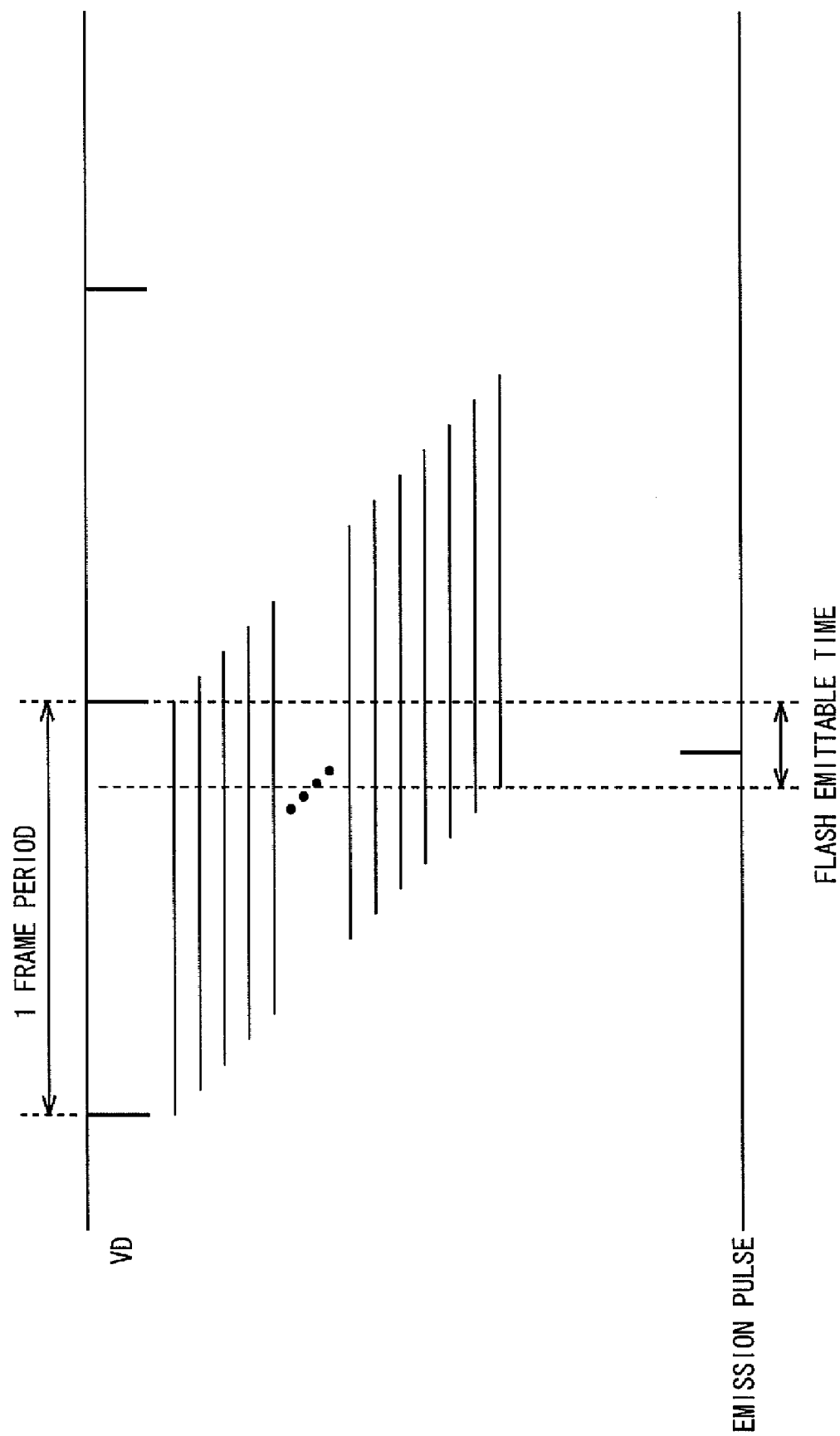

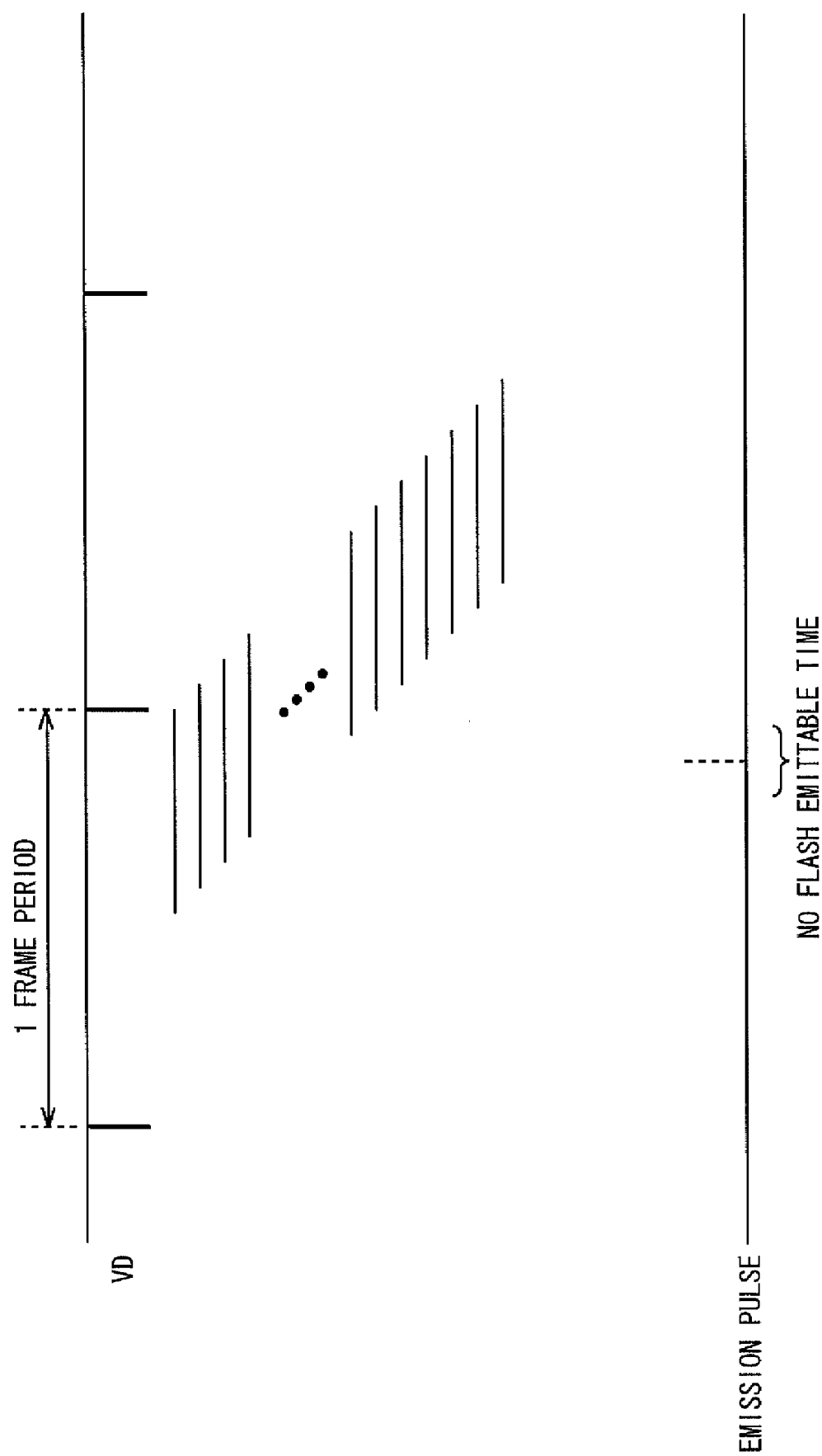

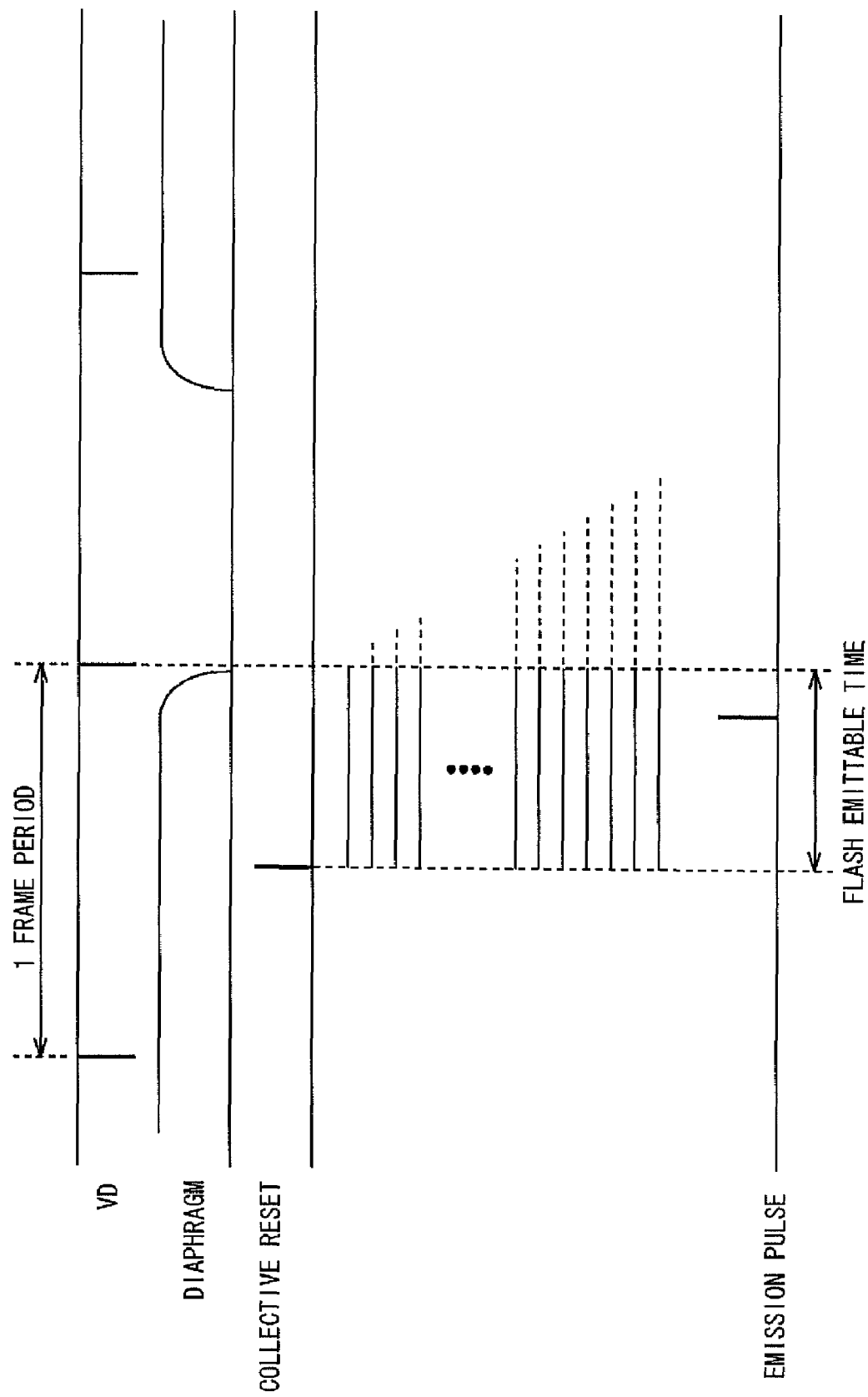

IMAGE SENSING APPARATUS HAVING AN IMAGE SENSOR

BACKGROUND OF THE INVENTION

1. Field of the Invention

The present invention relates to an imaging apparatus configured to control an operation of a flash emitting unit which emits flash to an object, and also relates to a control method therefor.

2. Description of the Related Art

There have been conventional imaging apparatuses configured to perform a flash control method for calculating an amount of main flash of a flash unit by performing, just before the main flash, a pre-flash to determine the amount of main flash.

In an imaging apparatus employing an image sensor, such as a complementary metal-oxide semiconductor (CMOS) sensor, of XY address type having pixels arranged in a two-dimensional matrix array on a light receiving surface, starting timings of exposure times respectively corresponding to reading lines of the image sensor vary with the reading lines. Consequently, it is difficult to allow the same reflected flash to fall on the entire light receiving surface of the image sensor. Accordingly, a conventional imaging apparatus performs a flash control method, according to which a pre-flash is synchronized with the starting timing of the exposure time corresponding to each reading line, thereby to continuously perform pre-flashes the number of which is equal to that of the reading lines (see Japanese Patent Application Laid-Open No. 2002-359774).

According to a flash control method using a global shutter in an imaging apparatus which employs an image sensor of the XY address type, a pre-flash of a flash unit is performed by adjusting the starting timings of exposure times respectively corresponding to all of the reading lines to a specific timing with the global shutter. However, in a case where the number of reading lines is large, the exposure time corresponding to the last reading line is long as compared with the exposure time corresponding to the first reading line. Thus, there is a large difference in exposure time between the first reading line and the last reading line. Accordingly, a lot of external light other than the flash is received by the last half of the reading lines of the image sensor.

Thus, a conventional imaging apparatus reduces an exposure time required to read data from the entire light receiving surface of the image sensor by thinning out the reading lines to be used, that is, decreasing the number of lines used for a pre-flash, so as to reduce a light exposure due to external light other than the flash. In this case, the conventional imaging apparatus performs a flash control method according to which an amount of main flash is calculated according to a difference between luminance data obtained by performing a pre-flash and luminance data obtained by similarly driving all pixels of the flash unit without performing a pre-flash (see Japanese Patent Application Laid-Open No. 2006-50337).

A conventional imaging apparatus, such as a digital video camera, employing a CMOS sensor performs a flash control method according to which an amount of main flash is calculated by comparing luminance data, which is obtained by a pre-flash performed immediately before a main flash, and luminance data obtained when no pre-flash is performed.

In a case where an electronic shutter speed is low, there is an overlapping timing with which a pre-flash is performed so that the exposure times respectively corresponding to the reading lines of the image sensor overlap. Therefore, when a pre-flash is performed at this pre-flash timing, the same reflected flash can fall on all of the reading lines. However, in a case where the electronic shutter speed is high, there is no overlapping timing with which a pre-flash is performed so that the exposure times respectively corresponding to the reading lines of the image sensor overlap. Accordingly, the same reflected flash cannot fall on all of the reading lines.

Thus, a conventional imaging apparatus employs a flash control method according to which a pre-flash is synchronized with the starting timing of the exposure times respectively corresponding to each of the reading lines, and according to which pre-flashes of the number of times equal to the number of the reading lines are consecutively performed to enable reflected flash to fall on the entire light receiving surface. Alternatively, according to another flash control method, the starting timings of exposure times respectively corresponding to all of the reading lines are adjusted to a specific timing by a global shutter to make the exposure times to overlap, so that the overlapping timing is generated. However, according to these methods, in a case where the number of reading lines is large, the exposure time corresponding to the last reading line is long as compared with the exposure time corresponding to the first reading line. Thus, there is a large difference in exposure time between the first reading line and the last reading line.

To prevent occurrence of a large difference in exposure time, a flash control method has been developed, according to which an exposure time required to read data from the entire light receiving surface of the image sensor is reduced by thinning out the reading lines to be used, that is, decreasing the number of lines used for a pre-flash, so that the same reflected flash can fall on the entire light receiving surface.

According to the former method for adjusting the starting timings of exposure times to be the same, it is necessary to divide a pre-flash by a number which is equal to the number of reading lines of the image sensor and to continuously emit flash. However, in this case, it is necessary to set an amount of flash emitted for a single emission time to be equal to or more than a value predetermined according to specifications of a flash lamp of the flash unit. Consequently, the former method has a drawback in that a resolution obtained during a pre-flash is low. Also, according to the latter method for thinning out the reading lines used for a pre-flash, the number of reading lines used for a pre-flash is reduced so as to suppress the influence of a light exposure of external light other than pre-flash on the entire light receiving surface. Consequently, the latter method also has a drawback in that a resolution obtained during a pre-flash is low.

Accordingly, in the conventional imaging apparatuses, in a case where the electronic shutter speed is equal to or higher than a predetermined value, it is difficult to accurately calculate an amount of main flash of a flash unit.

SUMMARY OF THE INVENTION

The present invention is directed to an imaging apparatus capable of accurately calculating an amount of main flash of a flash unit.

According to an aspect of the present invention, an imaging apparatus includes an image sensor configured to image an object to generate image data, a flash control unit configured to control a main flash, to be performed by a flash unit configured to emit flash to an object, according to preliminary image data generated by the image sensor in association with a pre-flash performed by the flash unit, a first drive unit configured to adjust starting timings of exposures performed at a plurality of lines of the image sensor to a same timing when the pre-flash is performed, and a second drive unit configured to shield the image sensor from light before the preliminary image data is read from the image sensor.

According to another aspect of the present invention, a method for controlling an imaging apparatus having an image sensor configured to image an object to generate image data includes controlling a main flash, to be performed by a flash unit configured to emit flash to an object, according to preliminary image data generated by the image sensor in association with a pre-flash performed by the flash unit, adjusting starting timings of exposures performed at a plurality of lines of the image sensor to a same timing when the pre-flash is performed, and shielding the image sensor from light before the preliminary image data is read from the image sensor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a chart illustrating a flash timing of a flash unit in a case where reading is performed using a rolling shutter when a shutter speed is low.

FIG. 4 is a chart illustrating a flash timing of a flash unit in a case where reading is performed using a rolling shutter when a shutter speed is high.

FIG. 5 is a chart illustrating a flash timing of a flash unit in a case where reading is performed using a global shutter when a shutter speed is high.

DETAILED DESCRIPTION OF THE EMBODIMENTS

Various exemplary embodiments, features, and aspects of the invention will be described in detail below with reference to the drawings.

Figure 1:
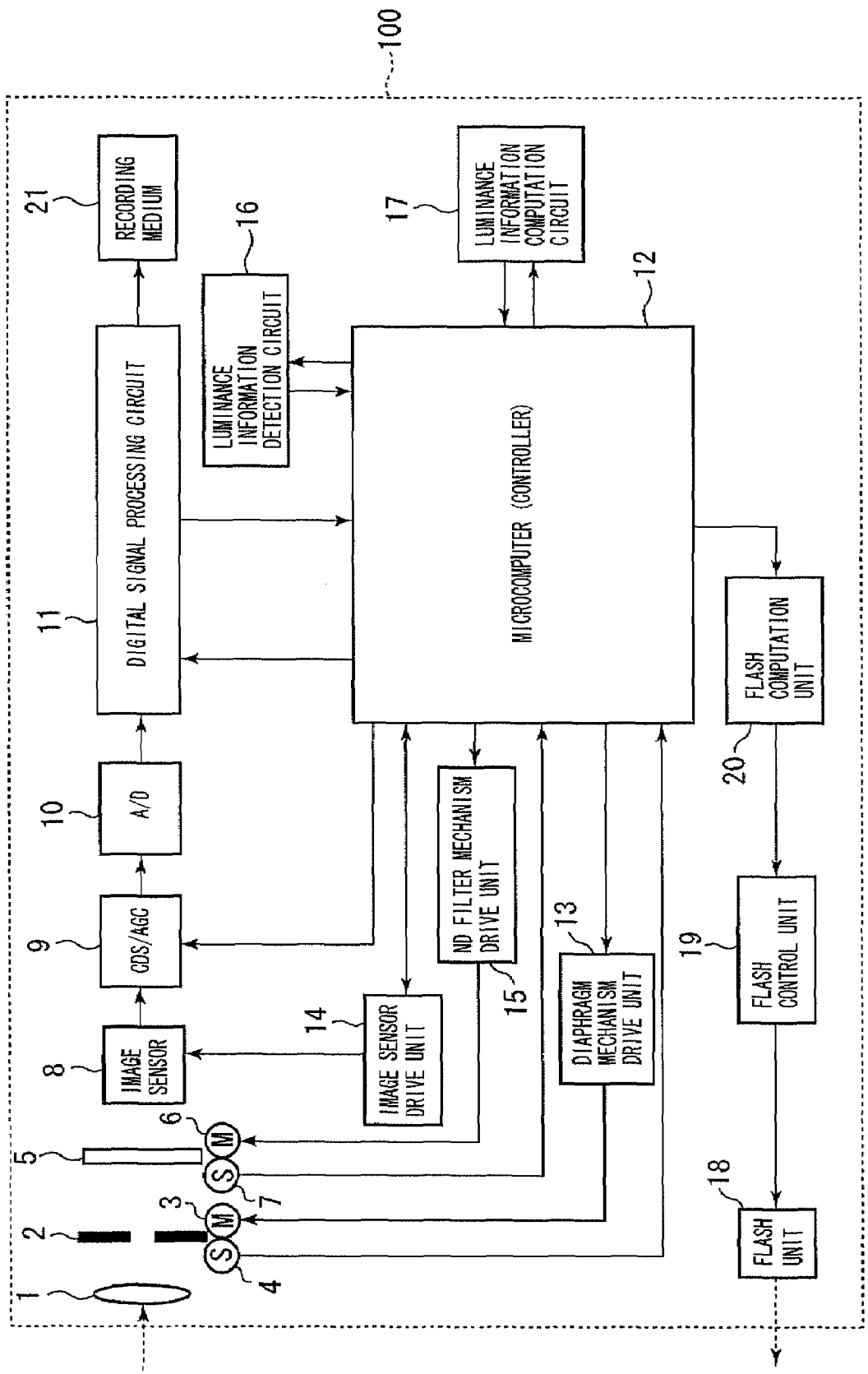
FIG. 1 is a diagram illustrating an example configuration of an imaging apparatus according to an exemplary embodiment of the present invention.

FIG. 1 illustrates a configuration of an imaging apparatus 100 according to an exemplary embodiment of the present invention. As illustrated in FIG. 1, a lens 1 introduces incident light into the imaging apparatus 100 from an outside thereof. For simplicity of drawing, only a single lens 1 is illustrated in FIG. 1. A diaphragm 2 adjusts an amount of incident light. A diaphragm drive motor 3 drives the diaphragm 2. A diaphragm state detection circuit 4 detects a driven state of the diaphragm 2.

The imaging apparatus 100 further includes a neutral density (ND) filter 5, an ND filter drive motor 6 configured to drive the ND filter 5, and an ND filter drive detection circuit 7 configured to detect a driven state of the ND filter 5. Incidentally, although the description of the present exemplary embodiment discusses the imaging apparatus 100 employing the ND filter 5, the present invention can be applied to an imaging apparatus including no ND filter.

An image sensor 8, such as a CMOS sensor, configured to image an object according to an exemplary embodiment is of the XY address type having pixels arranged in a two-dimensional matrix array on a light receiving surface. The image sensor 8 can be of any type other than a CMOS sensor, as long as the image sensor 8 is of the XY address type. Additionally, a plurality of reading lines connecting pixels, for example, in a row or column direction are provided in the image sensor 8, so that an electric charge (or image signal) stored at each of the pixels, which represents image data, is read via an associated one of the reading lines.

A CDS/AGC (correlated double sampling/auto gain control) circuit 9 is configured to perform sampling and amplification on image data that is based on electric charges (or image signals) stored at the pixels of the image sensor 8. An A/D conversion circuit 10 converts image data output from the CDS/AGC circuit 9 into a digital signal. A digital signal processing circuit 11 performs various signal processing on the digital image data output from the A/D conversion circuit 10.

A microcomputer 12 controls an operation of the imaging apparatus 100 according to the present exemplary embodiment. The microcomputer 12 receives luminance and color information from the digital signal processing circuit 11 and outputs control signals for use in various computations.

A diaphragm mechanism drive unit 13 supplies electric power to a diaphragm drive motor 3 under the control of the microcomputer 12. An image sensor drive unit 14 supplies drive pulses, according to which the image sensor 8 is driven, to the image sensor 8 under the control of the microcomputer 12. The image sensor drive unit 14 has functions of electronic shutters, such as a rolling shutter and a global shutter, which will be described later.

An ND filter mechanism drive unit 15 supplies electric power to the ND filter drive motor 6 under the control of the microcomputer 12. A luminance information detection circuit 16 detects luminance data according to the digital image data sent from the microcomputer 12. A luminance information computation circuit 17 performs computation on the luminance data detected by the luminance information detection circuit 16.

A flash unit 18 emits flash to an object. A flash control unit 19 controls flashing to be performed by the flash unit 18. A flash computation unit 20 performs computation on an amount of flash to be emitted by the flash unit 18 and flashing timing, with which flash is emitted from the flash unit 18, using a result of the computation performed on the luminance data, which is sent from the microcomputer 12. Image data generated by the imaging apparatus 100 is recorded on a recording medium 21.

An object can be imaged by the imaging apparatus 100 using the flash unit 18 at an amount of main flash. Thus, the flash computation unit 20 computes an amount of pre-flash, to be emitted from the flash unit 18, and an overlapping timing, with which a pre-flash is performed by the flash unit 18. Then, the flash control unit 19 controls the flash unit 18 according to a result of computation performed by the flash computation unit 20. Then, a pre-flash is performed by the flash unit 18 at an amount of pre-flash, which is computed by the flash computation unit 20.

At that time, the image sensor 8 detects image information on the object. Then, the electric charge stored at each of the pixels of the image sensor 8 is output as an analog signal representing image data. The CDS/AGC circuit 9 performs sampling and amplification on the signal. Subsequently, the analog signal representing the image data is converted by the A/D conversion circuit 10 into a digital signal. The digital signal is sent to the digital signal processing circuit 11. The digital signal processing circuit 11 performs various signal processing on image data represented by the digital signal output from the A/D conversion circuit 10. The microcomputer 12 sends results of the various signal processing to the luminance information detection circuit 16. The luminance information detection circuit 16 then detects the luminance data.

Subsequently, the luminance information computation circuit 17 computes a difference between luminance data, which is obtained during the pre-flash and detected by the luminance information detection circuit 16, and luminance data obtained when no pre-flash is performed. According to a result of the computation of the difference, the flash computation unit 20 calculates an amount of main flash to be emitted by the flash unit 18 for actually imaging an object. Then, the flash control unit 19 performs a control operation for causing the flash unit 18 to emit flash to the object at the amount of main flash for imaging the object, which is calculated by the flash computation unit 20.

An operation of the imaging apparatus 100 according to an exemplary embodiment is performed as follows. In a case where the microcomputer 12 detects that the electronic shutter speed is set such that the exposure times respectively corresponding to all of the reading lines of the image sensor 8 do not overlap when the flash unit 18 is used, that is, the electronic shutter speed is high, the microcomputer 12 sends to the image sensor drive unit 14 a control signal to change the rolling shutter to the global shutter (to be described later). The microcomputer 12 further sends to the flash computation unit 20 a control signal to perform a pre-flash of the flash unit 18.

At that time, the flash computation unit 20 computes an amount of pre-flash of the flash unit 18. According to a result of the computation by the flash computation unit 20, the flash control unit 19 controls and causes the flash unit 18 to perform a pre-flash. Subsequently, before the image sensor drive unit 14 sends the next reading pulse to the image sensor 8, the microcomputer 12 controls the diaphragm mechanism drive unit 13 to drive the diaphragm drive motor 3 to close the diaphragm 2.

The present exemplary embodiment has a feature that in a case where the electronic shutter speed is high, the image sensor drive unit 14 changes a reading control method for the image sensor 8 from a rolling shutter to a global shutter, which adjusts the starting timings of exposure times respectively corresponding to reading lines of the image sensor 8 to a same timing. Then, to adjust the exposure times respectively corresponding to all of the reading lines of the image sensor 8 to be the same, the microcomputer 12 controls the diaphragm mechanism drive unit 13 to close the diaphragm 2 before the image sensor drive unit 14 sends the next reading pulse to the image sensor 8. For readily understanding of the present invention, FIG. 1 illustrates an exemplary embodiment having a circuit configuration in which all circuit components are independent of one another. However, the imaging apparatus 100 can be configured so that all or a part of the circuit components are implemented in the microcomputer 12.

Figure 2:
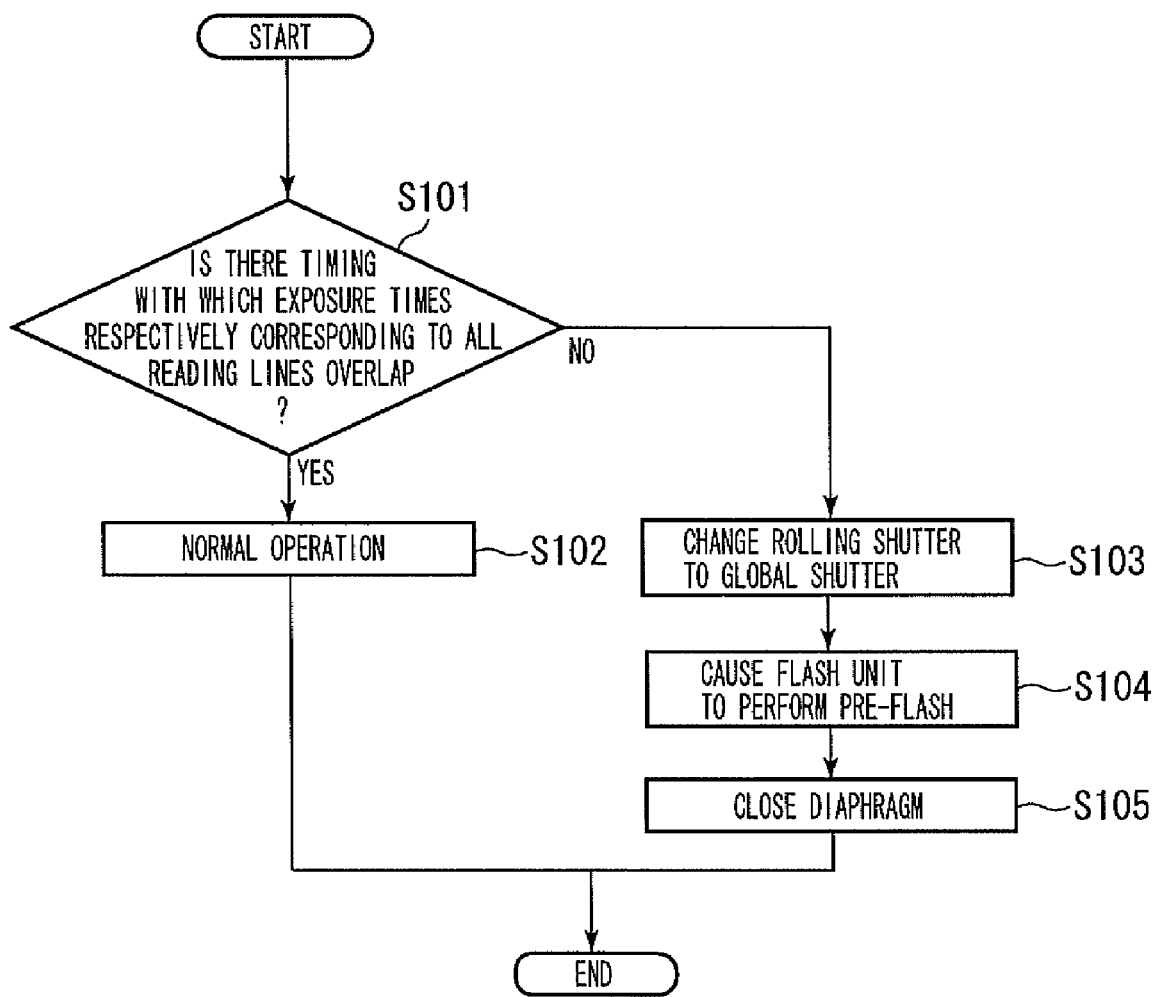
FIG. 2 is a flowchart illustrating an example control method performed by the imaging apparatus according to an exemplary embodiment of the present invention.

A control method performed by the imaging apparatus 100 according to an exemplary embodiment is described below. FIG. 2 is a flowchart illustrating the control method performed by the imaging apparatus 100 according to an exemplary embodiment of the present invention. More specifically, FIG. 2 illustrates a method for controlling a pre-flash of the flash unit 18.

According to the present exemplary embodiment, to compute an amount of main flash to be emitted by the flash unit 18 when the flash unit 18 is used, a pre-flash is performed before the main flash.

First, in step S101, the microcomputer 12 determines whether the electronic shutter speed of the shutter, whose function is performed by the image sensor drive unit 14, is set so that the exposure times respectively corresponding to all of the reading lines of the image sensor 8 overlap.

In a case where the electronic shutter speed allows the presence of an overlapping timing with which a pre-flash is performed so that the exposure times respectively corresponding to all of the reading lines of the image sensor 8 overlap (YES in step S101), processing proceeds to step S102. Then, in step S102, the microcomputer 12 performs a normal pre-flash control operation on the flash unit 18. More specifically, according to the present exemplary embodiment, the reading control method is performed with a rolling shutter, according to which the starting timing of the exposure time is sequentially shifted among the exposure times respectively corresponding to the reading lines of the image sensor 8. Thus, a pre-flash is performed by the flash unit 18 with the overlapping timing. Then, processing illustrated in this flowchart ends.

On the other hand, in a case where the electronic shutter speed does not allow the presence of an overlapping timing with which a pre-flash is performed so that the exposure times respectively corresponding to all of the reading lines of the image sensor 8 overlap (i.e., the electronic shutter speed is high (NO in step S101)), processing proceeds to step S103. In step S103, the image sensor drive unit 14 changes the reading control method for the image sensor 8 from the normal rolling shutter to a global shutter under the control of the microcomputer 12.

Before a pre-flash is performed, the image sensor 8 is already reset with the rolling shutter, according to which the starting timing of the exposure time is sequentially shifted among the exposure times respectively corresponding to all of the reading lines of the image sensor 8.

Subsequently, in step S104, because the starting timings of exposure times respectively corresponding to all of the reading lines of the image sensor 8 are adjusted by the global shutter to a same timing, the microcomputer 12 performs a control operation for performing a pre-flash of the flash unit 18 with the overlapping timing.

In step S105, the diaphragm mechanism drive unit 13 closes the diaphragm 2 under the control of the microcomputer 12. Then, processing illustrated in this flowchart ends.

Thus, the imaging apparatus 100 according to the present exemplary embodiment performs an operation for controlling a pre-flash to be performed by the flash unit 18 with a sequence of steps S101 to S105.

A characteristic operation of the imaging apparatus 100 according to the present embodiment is described below. In a case where the electronic shutter speed defined with a driving pulse sent from the image sensor drive unit 14 is low and where there is an overlapping timing with which a pre-flash is performed so that the exposure times respectively corresponding to all of the reading lines of the image sensor 8 overlap, the flash unit 18 emits flash with the overlapping timing, as illustrated in FIG. 3. Consequently, even in a case where the normal rolling shutter is employed as the reading control method, reflected flash can fall on the entire light receiving surface of the image sensor 8. Each of line segments illustrated in FIG. 3 represents the exposure time corresponding to an associated one of the reading lines. Additionally, reading pulses VD are output from the image sensor drive unit 14 to the image sensor 8.

On the other hand, in a case where the electronic shutter speed defined with a driving pulse sent from the image sensor drive unit 14 is high and where there is no timing with which a pre-flash is performed so that the exposure times respectively corresponding to all of the reading lines of the image sensor 8 overlap, as illustrated in FIG. 4, the reading control method for the image sensor 8 is changed to a global shutter. This operation of changing the rolling shutter to the global shutter is performed by the image sensor drive unit 14 under the control of the microcomputer 12.

Consequently, according to the global shutter, the starting timings of exposure times respectively corresponding to all of the reading lines of the image sensor 8 are adjusted to a same timing in response to a collective reset signal sent from the image sensor drive unit 14 to each of the pixels of the image sensor 8, as illustrated in FIG. 5. Thus, the same reflected flash can fall on the entire light receiving surface of the image sensor 8 when a pre-flash of the flash unit 18 is performed with overlapping timing.

According to the characteristics of the image sensor 8 of the XY address type, the exposure time corresponding to each reading line illustrated in FIG. 5 varies with the reading line, as indicated with dotted lines in FIG. 5. Therefore, at that time, a control operation for closing the diaphragm 2 is performed to shield the image sensor 8 from incident light, which is represented by dotted lines in FIG. 5. Consequently, the exposure times respectively corresponding to all of the reading lines of the image sensor 8 can be adjusted to be the same. Accordingly, the entire light receiving surface of the image sensor 8 can receive reflected flash with a single pre-flash. Thus, the accuracy of calculating an amount of main flash to be emitted from the flash unit 18 can be enhanced.

OTHER EXEMPLARY EMBODIMENTS

Each of the units illustrated in FIG. 1 constituting the imaging apparatus according to the above-described present exemplary embodiment and each of the steps of the control method performed by the imaging apparatus, which are illustrated in FIG. 2, can be implemented by executing a program stored in a random access memory (RAM) or a read-only memory (ROM) of a computer. The program and a computer-readable storage medium storing the programs can be included in the scope of the present invention.

More specifically, the program can be provided to a computer by being recorded on a storage medium, for example, a compact disc-ROM (CD-ROM), or through various transmission media. A flexible disk, a hard disk, an optical disk, a magnetic tape, a magneto-optical disk, a nonvolatile memory card, or the like can be used as the storage medium on which the program is recorded, in addition to a CD-ROM. On the other hand, communication media in computer network systems (a local area network (LAN), a wide area network (WAN), such as the Internet, a radio communication network, and so on) for supplying program information by transmitting the program information as carrier waves can be used as the transmission media for the program. Additionally, wire circuits formed of optical fibers, and radio links can be cited as the communication media used at that time.

The present invention includes a program not only in a case where the program supplied to a computer is executed by a computer to implement the functions of the exemplary embodiments, but also in a case where the program is used in association with an operating system (OS) or another application software running on a computer. Also, the present invention includes a program in a case where the functions of the above-described exemplary embodiments are implemented by performing all or apart of processing so that a supplied program is executed by a function expansion board of a computer or a function expansion unit connected to a computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-206966 filed Jul. 28, 2006, which is hereby incorporated by reference herein in its entirety.

What is claimed is:

1. An imaging apparatus comprising:
   an image sensor of XY address type configured to image an object;
   a flash unit configured to flash the object;
   a diaphragm configured to adjust the amount of incident light to the image sensor;
   a diaphragm drive unit configured to drive the diaphragm;
   an image sensor drive unit configured to drive the image sensor; and
   a control unit configured to determine whether electronic shutter speed of the image sensor has an overlapping exposure time at all of the reading lines of the image sensor or not, when calculating the amount of the flash from the flash unit when imaging the object according to the image data imaged by the image sensor on the basis of a pre-flash of the flash unit,
   wherein, from the result of the determination, in case that the electronic shutter speed has an overlapping exposure time at all of the reading lines of the image sensor, the image sensor drive unit is controlled so that reading is performed by using a rolling shutter such that the starting timing of the exposure time at each of the reading lines of the image sensor sequentially shifts, and also the flash unit is controlled so as to perform a pre-flash in the same timing as the exposure time overlaps,
   wherein, from the result of the determination, in case that the electronic shutter speed does not have the overlapping exposure time at all of the reading lines of the image sensor, the image sensor drive unit is controlled so that the reading is performed by using a global shutter which adjusts the starting times of the exposure time at each of the reading lines of the image sensor, and the flash unit is controlled so as to perform a pre-flash in the same timing as the exposure time overlaps, and the diaphragm drive unit is controlled so as to shield the image sensor from the light by closing the diaphragm before performing the reading of the image data from the image sensor.

2. A method for controlling an imaging apparatus having an image sensor of XY address type configured to image an object, a flash unit configured to flash the object, a diaphragm configured to adjust the amount of incident light to the image sensor, comprising steps of:
   when calculating the amount of the flash from the flash unit when imaging the object according to the image data imaged by the image sensor on the basis of a pre-flash of the flash unit,
   determining whether electronic shutter speed of the image sensor has an overlapping exposure time at all of the reading lines of the image sensor or not;
   controlling an image sensor drive unit so that reading is performed by using a rolling shutter such that the staffing timing of the exposure time at each of the reading lines of the image sensor sequentially shifts, and controlling the flash unit so as to perform a pre-flash in the same timing as the exposure time overlaps, in the case it is determined that the electronic shutter speed has an overlapping timing of the exposure times at all of the reading lines of the image sensor; and controlling the image sensor drive unit so that the reading is performed by using a global shutter which adjusts the staffing times of the exposure time at each of the reading lines of the image sensor, controlling the flash unit so as to perform a pre-flash in the same timing as the exposure time overlaps, and controlling a diaphragm drive unit so as to shield the image sensor from light by closing the diaphragm before performing the reading of the image data from the image sensor, in the case it is determined that the electronic shutter speed does not have an overlapping timing of the exposure times at all of the reading lines of the image sensor.

* * * * *